US009891888B2

(12) United States Patent
Riou

(10) Patent No.: US 9,891,888 B2
(45) Date of Patent: Feb. 13, 2018

(54) DIGITAL TRUE RANDOM NUMBER GENERATOR BASED ON S-BOXES

(71) Applicant: NXP B.V., Eindhoven (NL)

(72) Inventor: Sebastien Riou, Seoul (KR)

(73) Assignee: NXP B.V., Eindhoven (NL)

( * ) Notice: Subject to any disclaimer, the term of this patent is extended or adjusted under 35 U.S.C. 154(b) by 315 days.

(21) Appl. No.: 14/741,964

(22) Filed: Jun. 17, 2015

(65) Prior Publication Data

US 2016/0371059 A1  Dec. 22, 2016

(51) Int. Cl.
*G06F 7/58* (2006.01)
*H04L 9/00* (2006.01)

(52) U.S. Cl.
CPC .............. *G06F 7/588* (2013.01); *H04L 9/002* (2013.01)

(58) Field of Classification Search
CPC ................ G06F 9/58–9/588; H04L 9/00–9/38
USPC .................................................. 708/250–255
See application file for complete search history.

(56) References Cited

U.S. PATENT DOCUMENTS

| | | | |
|---|---|---|---|
| 6,240,432 B1 | 5/2001 | Chuang et al. | |
| 6,807,553 B2 | 10/2004 | Oerlemans | |
| 7,389,316 B1 | 6/2008 | Baetoniu et al. | |
| 7,424,500 B2 * | 9/2008 | Fukushima | G06F 7/588 708/251 |
| 8,260,835 B2 | 9/2012 | Fukushima et al. | |
| 8,341,201 B2 | 12/2012 | Vasyltsov et al. | |
| 8,489,660 B2 | 7/2013 | Herbert et al. | |
| 8,744,073 B2 | 6/2014 | Dror et al. | |
| 8,805,906 B2 | 8/2014 | Vergnes et al. | |
| 2004/0041606 A1* | 3/2004 | Kirsch | G11C 7/22 327/161 |
| 2005/0004960 A1 | 1/2005 | Hars et al. | |

(Continued)

FOREIGN PATENT DOCUMENTS

CN  101515228 A  8/2009
CN  103049242 A  4/2013
(Continued)

OTHER PUBLICATIONS

Maliky, Sattar Sadkhan Al ("Multidisciplinary Perspectives in Cryptology and Information Security", Publisher: IGI Global, on Mar. 31, 2014, ISBN: 1-4666-5808-8).*

(Continued)

*Primary Examiner* — Chuong D Ngo
(74) *Attorney, Agent, or Firm* — Rajeev Madnawat

(57) ABSTRACT

Various embodiments relate to a device including a digital component configured to output a plurality of parallel bits based on an input wherein the digital component is capable of occupying a metastable state between a time the input is changed and a time the output plurality of parallel bits changes based on the changed input, wherein the digital component outputs metastable bits while occupying the metastable state; and a synchronous sampling circuit configured to sample bits from the digital component in synchronization with a received clock signal pulse, wherein when the clock signal pulse occurs while the digital component occupies a metastable state, the synchronous sampling circuit samples metastable bits, and wherein the input into the digital component changes in a manner that is asynchronous with respect to the clock signal pulse. In various embodiments, the digital component is a substitution box (S-box).

19 Claims, 5 Drawing Sheets

(56) References Cited

U.S. PATENT DOCUMENTS

| | | | | |
|---|---|---|---|---|
| 2007/0244950 A1* | 10/2007 | Golic | ................ | G06F 7/582 |
| | | | | 708/250 |
| 2010/0201419 A1* | 8/2010 | Vasyltsov | ............ | H03K 3/84 |
| | | | | 327/164 |
| 2010/0281088 A1* | 11/2010 | Wilber | ............... | G06F 7/588 |
| | | | | 708/251 |
| 2012/0008767 A1* | 1/2012 | Smith | ............... | H04L 9/0631 |
| | | | | 380/28 |

FOREIGN PATENT DOCUMENTS

| | | | | |
|---|---|---|---|---|
| EP | 2329356 A1 | 6/2011 | | |
| WO | 2006015625 A1 | 2/2006 | | |
| WO | 2010/031630 A1 | 3/2010 | | |
| WO | 2014177300 A1 | 11/2014 | | |
| WO | WO 2014177300 A1 * | 11/2014 | ............ | G06F 7/588 |
| WO | WO 2015176836 A1 * | 11/2015 | ............ | G06F 7/588 |

OTHER PUBLICATIONS

Swenson, Christopher ("Modern Cryptanalysis: Techniques for Advanced Code Breaking", Publisher: John Wiley & Sons, on Mar. 17, 2008, ISBN: 978-0-470-13593-8).*

Extended European Search Report for Patent Appln. No. 16171474.6 (Nov. 14, 2016).

Cherkaoui, et al., "A Very High Speed True Random Number Generator with Entropy Assessment", CHES 2013, Workshop on Cryptographic Hardware and Embedded Systems, Santa Barbara, Aug. 2013.

* cited by examiner

200

| MSB \ LSB | 00 | 01 | 10 | 11 |
|---|---|---|---|---|
| 00 | 0011 | 0110 | 1111 | 1100 |
| 01 | 1101 | 0100 | 1001 | 1011 |
| 10 | 0101 | 1000 | 0001 | 0000 |
| 11 | 1010 | 0010 | 0111 | 1110 |

| MSB \ LSB | 00 | 01 | 10 | 11 |
|---|---|---|---|---|
| 00 | 1011 | 1010 | 1101 | 0000 |
| 01 | 0101 | 1000 | 0001 | 1110 |
| 10 | 1001 | 0110 | 1100 | 0111 |
| 11 | 0011 | 0100 | 1111 | 0010 |

FIG. 3

DIGITAL TRUE RANDOM NUMBER GENERATOR BASED ON S-BOXES

TECHNICAL FIELD

Various embodiments disclosed herein relate generally to cryptography and, more particularly but not exclusively, to random number generation.

BACKGROUND

Secure implementations of cryptographic protocols sometimes rely on the use of true random numbers: numbers which are generated in a non-deterministic way and are, therefore, unpredictable. As a result, many integrated circuits (ICs) include a true random number generator (TRNG) to provide a source of these numbers. Care must be taken, however, to obscure the TRNG because, otherwise, an implementation may lend itself to active probing attacks.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of a preferred embodiment adequate to allow those of ordinary skill in the art to make and use the inventive concepts will follow in later sections.

Various embodiments described herein relate to a hardware device for generating random numbers including: a plurality of substitution boxes (S-Boxes) connected to each other in a series, wherein a plurality of bits output from an S-Box of the plurality of S-Boxes is input into another S-Box of the plurality of S-Boxes; a sampling circuit configured to sample bit strings from at least one S-Box of the plurality of S-Boxes.

Various embodiments are described wherein: the plurality of S-Boxes includes a forward S-Box configured to implement first function that maps input bit strings to respective output bit strings, and a reverse S-Box configured to implement a second function that is an inverse of the first function, wherein the forward S-Box outputs a plurality of bits to an input of the reverse S-Box.

Various embodiments are described wherein: the plurality of S-Boxes further includes series of tail S-Boxes including: at least one tail S-Box, including a first tail S-Box configured to receive, as input, output from the reverse S-Box.

Various embodiments are described wherein each tail S-Box in the series of tail S-Boxes implements the second function.

Various embodiments are described wherein the sampling circuit includes a plurality of XOR gates configured to combine a plurality of bit strings received from each of the forward S-Box, the reverse S-Box, and each tail S-Box of the plurality of tail S-Boxes.

Various embodiments are described wherein the sampling circuit includes a plurality of XOR gates configured to combine at least two bit strings received from different parts of the plurality of S-Boxes.

Various embodiments are described wherein the sampling circuit further includes: a sampled number register configured to receive, as input, a combined bitstring output by the plurality of XOR gates, and upon receiving a pulse from a clock signal, store the combined bitstring.

Various embodiments additionally include a state advancement circuit configured to move a signal output by the forward S-Box to the input of the forward S-Box when the reverse S-Box reaches a stable state.

Various embodiments are described wherein the state advancement circuit includes: an input register configured to receive, as input, a substituted bitstring output by forward S-Box, upon receiving an asynchronous pulse, store the substituted bitstring, and output a stored bitstring to the input of the forward S-Box; a comparator circuit configured to compare a bitstring input to the forward S-Box with a bitstring output by the reverse S-Box, and when the bitstring input matches a bitstring output by the reverse S-Box, generate the asynchronous pulse.

Various embodiments are described wherein: the plurality of S-Boxes is configured in a ring of S-Boxes such that: each S-Box of the plurality of S-Boxes provides output to an input of a next S-Box of the ring of S-Boxes.

Various embodiments are described wherein each S-Box implements the same function mapping input bitstrings to respective output bitstrings.

Various embodiments are described wherein: a first S-Box of the plurality of S-Boxes is capable of occupying a number of different states, a; and the plurality of S-Boxes includes a number of S-Boxes, b, that is coprime with the number of different states, a.

Various embodiments are described wherein the sampling circuit is configured to sample a plurality of bit strings from the plurality of S-Boxes, respectively, the device further including: a post-processing circuit configured to compress the plurality of bit strings.

Various embodiments are described wherein the sampling circuit configured to sample bit strings from a non-input/output internal portion of at least one S-Box of the plurality of S-Boxes Various embodiments described herein relate to a hardware device for generating random numbers including: a digital component configured to output a plurality of parallel bits based on an input wherein the digital component is capable of occupying a metastable state between a time the input is changed and a time the output plurality of parallel bits changes based on the changed input, wherein the digital component outputs metastable bits while occupying the metastable state; and a synchronous sampling circuit configured to sample bits from the digital component in synchronization with a received clock signal pulse, wherein when the clock signal pulse occurs while the digital component occupies a metastable state, the synchronous sampling circuit samples metastable bits, and wherein the input into the digital component changes in a manner that is asynchronous with respect to the clock signal pulse.

Various embodiments are described wherein the digital component is a substitution box (S-Box).

The hardware device of claim 15, further including an inverse digital component that performs an inverse operation of the digital component, whereby the digital component and inverse digital component are arranged in sequence to form a pair of digital components.

Various embodiments additionally include a state advancement circuit configured to change the input into the digital component when an input into the pair of digital components matches an output of the pair of digital components.

Various embodiments are described wherein the manner in which the input into the digital component changes enables metastable bits to be moved from the output of the digital component to the input of the digital component.

Various embodiments are described further including: an additional digital component, wherein the synchronous sampling circuit configured to sample additional bits from the additional digital component in synchronization with the received clock signal pulse; and a synchronous post-processing circuit configured to compress the sampled bits and additional bits.

BRIEF DESCRIPTION OF THE DRAWINGS

In order to better understand various embodiments, reference is made to the accompanying drawings, wherein:

FIG. 2 illustrates an example of a function for a forward substitution box (S-box);

FIG. 3 illustrates an example of a function for a reverse S-box;

To facilitate understanding, identical reference numerals have been used to designate elements having substantially the same or similar structure or substantially the same or similar function.

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term, "or" refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

Existing true random number generators (TRNGs) may use analog entropy sources (which are large and, therefore, easy to identify) or entropy sources made of digital logic having a specific layout (e.g., a hardmacro, which is also easily identified by an attacker). These existing systems often generate only a few hundred kilobytes per second, while a consuming application would be better served by a TRNG that produces multiple megabytes per second. Further, existing digital implementations (e.g., arrays of ring oscillators) are easily influenced by outside electromagnetic perturbations in ways which are difficult to detect. Accordingly, it would be desirable to provide a TRNG that is capable of generating random numbers at a higher rate while being difficult for an attacker to identify and influence.

Various embodiments described herein provide improved TRNGs through the use of substitution box (S-box) components rather than the typical buffers and inverters. Various example arrangements herein leverage the metastable states of one or more S-boxes to generate random numbers at high rates relative to the number of S-boxes used. The low number of S-boxes used to implement an oscillator and the high number of connections between such components means that automatic layout tools tend to keep the implementation compact and efficient (e.g., for both ASIC and FPGA technologies). As a result, the entropy source integrates seamlessly with the rest of the digital logic and is therefore difficult to identify in the IC layout. Even if it is found, the entropy source's parallel nature means that manipulating it with active probing is several times more difficult.

Figure 1:
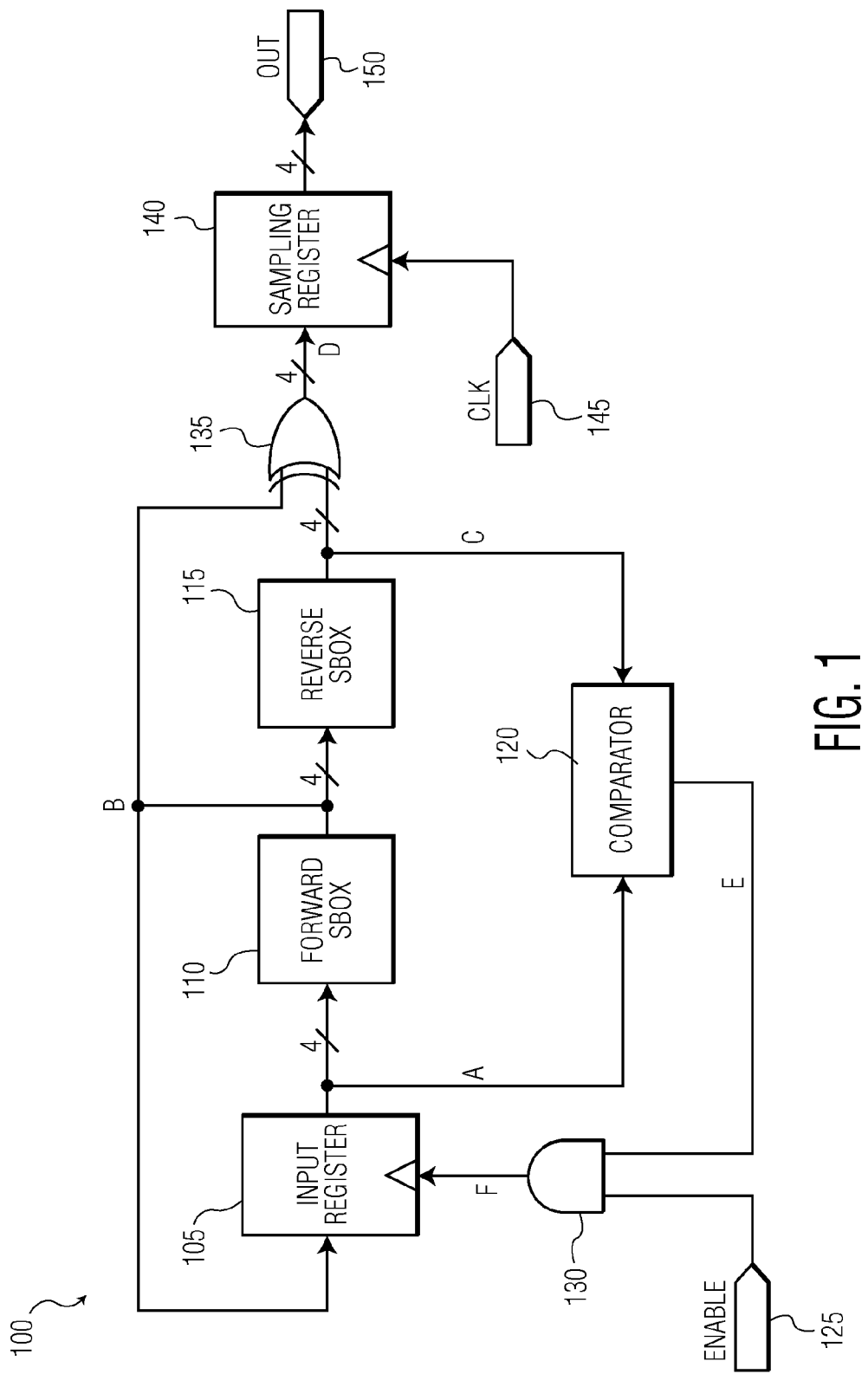
FIG. 1 illustrates a first example of a digital true random number generator (TRNG)

FIG. 1 illustrates a first example of a digital true random number generator (TRNG) 100. As shown, the TRNG 100 includes an input register 105, a forward S-box 110, a reverse S-box 115, a comparator 120, an ENABLE input 125, an AND gate 130, an XOR gate array 135, a sampling register 140, a clock input 145, and an output 150.

As shown, the input register 105, forward S-box 110, reverse S-box 115, comparator 120, XOR gate array 135, sampling register 140, and output 150 all accept and operate on four bits at a time. Thus, for example, the registers 105, 140 may both include four flip-flops or other memory cells sufficient to store 4 bits at a time. Similarly, the XOR gate array 135 may include four individual XOR gates. As such and as will be apparent in view of the operation set forth below, the TRNG 100 may generate four random bits on each clock 145 pulse. It will be appreciated that various alternative embodiments may include components sufficient to generate more or fewer bits on each clock 145 pulse. Appropriate modifications to achieve such alternative functionality will be apparent in view of the following description.

The S-boxes 110, 115 may both be components that are configured to receive a plurality of bits and output a corresponding plurality of bits based on a function implemented therein. For example, as shown, the two S-boxes 110, 115 are 4:4 S-boxes: they each accept 4 input bits and provide 4 corresponding output bits. It will be apparent that in various embodiments, S-boxes having different bit ratios may be used. For example, in embodiments wherein 8 bits are produced each clock pulse, the S-boxes 110, 115 may be 8:8 S-boxes. In some embodiments, the S-boxes 110, 115 may have a different number of inputs than outputs. For example, the forward S-box 110 may implement a 4:8 ratio while the reverse S-box 115 may implement an 8:4 ratio. Various modifications to implement these and other alternatives will be apparent.

As noted, the S-boxes 110, 115 implement transformative functions. These functions may be virtually any function sufficient to deterministically produce an output bitstring based on an input bitstring such as, for example, a mathematical function or a lookup table. Two examples of lookup table functions will be described in greater detail below with respect to FIGS. 2-3. In the embodiment shown, the reverse S-box 115 implements an inverse function of the forward S-box 110. Thus, where the forward S-box 110 implements a function f(x), the reverse S-box 115 implements a function g(x) such that g(f(x))=x. Further, as shown, the output bitstring B of the forward S-box 110 is provided directly to the inputs of the reverse S-box 115. Thus, when the S-boxes 105, 110 both reach a stable state, the output bitstring C of the reverse S-box 115 will be equal to the input bitstring A to the forward S-box 110 (and the contents of the input register 105 because, as shown, the input register contents are provided to the inputs of the forward S-box 110).

The input register 105 receives, as input, the output bitstring B from the forward S-box 105. Thus, when the input register 105 receives a pulse (which will be described below), the output bitstring B is moved into the input register 105 and to the input of the forward S-box 110. As such, a pulse received by the input register 105 has the effect of advancing the state of the S-boxes 110, 115. In various embodiments, the function implemented by the forward S-box 110 provides a single continuous cycle through all possible combinations of input; in such embodiments, it will be apparent that, through a sufficient number of pulses to the input register 105, the bitstring input into the forward S-box 110 will likely traverse every possible bitstring.

To advance the state of the digital components 110, 115, the TRNG includes a state advancement circuit (comparator 120 and AND gate 130 in this example) that provides a pulse to the input register 105 whenever the S-boxes 110, 115 achieve a stable state. As such, the values output by the S-boxes 110, 115 will constantly change while the TRNG 100 is enabled 125. As shown, the state advancement circuit includes the comparator 120 and a single AND gate 130. The comparator 120 may be virtually any logic arrangement sufficient to indicate when the forward S-box 110 input bitstring A matches the reverse S-box 115 output bitstring C. For example, the comparator 120 may include multiple NXOR gates combining corresponding bits from the two bitstrings A, C, and a single AND gate combining the outputs from the NXOR gates. Various other comparator implementations will be apparent. Regardless of comparator 120 implementation, when the two bitstrings A, C match, the comparator outputs a signal E which is delivered, through the AND gate 130 when the Enable signal 125 is high, to the input register as a pulse (thereby, advancing the S-box 110, 115 state). It will be apparent that, through operation of the AND gate, when the Enable signal 125 is low, no pulses will be delivered to the input register 105 and the S-boxes 110, 115 will reach and retain their stable state, thereby ceasing random number generation. It will also be apparent that, in various alternative implementations, the logic may be reversed; for example, the Enable signal may instead be asserted as high to prevent number generation while a low signal may allow the state advancement pulse to be delivered to the register. Modifications to achieve such alternative behavior will be apparent.

A sampling circuit is also provided to extract random numbers for use by cryptographic applications. As shown, the sampling circuit includes the XOR gate array 135 and sampling register 140. The XOR gate array combines the output signals B, C of the two S-boxes 110, 115 and provides the resulting bitstring D to the input of the sampling register 140. A clock signal 145 is provided to the sampling register 140 such that, on each clock 145 pulse, the XOR 135 output bitstring D is moved into the sampling register 140 and thereby provided to the output 150 as a sampled random number. Thus, in the example shown, 4 random bits are provided per clock 145 pulse. In various embodiments, the clock 145 may be chosen to exhibit appreciable jitter, thereby introducing additional entropy into the TRNG 100.

It will be apparent that numerous alternative sampling arrangements may be utilized. For example, alternative logic to XOR gates 135 may be used to combine bitstrings B, C. Additionally, the bits within the strings B, C may not be compared to each other on a per-position basis; instead, one or more bitstrings B, C may be input into the XOR gates 135 in a different order than the other. Further, additional or alternative bitstrings may be sampled from other parts of the TRNG 100 such as, for example, from within the S-Boxes 110, 115. Thus, in some alternative embodiments, the XOR gates 135 may be replaced with logic that includes an XOR gate that receives a first bit of bitstring B and a third bit of bitstring C; a NXOR gate that receives a second bit of bitstring B, and a bit sampled from a point internal to the reverse S-boxes 115, etc. Various alternative arrangements in view of the foregoing will be apparent.

It will be noted that the pulses into the input register 105 and sampling register 140 are independent from one each other. While the sampling register 140 operates based on a synchronous clock signal, the input register receives an asynchronous, non-regular signal that indicates the stable state of the TRNG 100 (e.g., that the input to the forward S-box 110 matches the output from the reverse S-Box 115). Thus, the sampling circuit samples numbers regardless of whether the S-boxes 110, 115 are currently stable or unstable. Combined with the practicality that the S-boxes 110, 115 are likely to exhibit one or more metastable outputs prior to reaching each stable state, the TRNG provides a reliable entropy source.

FIG. 2 illustrates an example of a function 200 for a forward substitution box (S-box). The function 200 may be the function implemented by the forward S-box 110 of the first example TRNG 100. As shown, the function 200 is visualized as a lookup table with the two most-significant input bits (MSB) along the left and the two least-significant input bits (LSB) along the top. Thus, for an input bitstring of "0110," an S-box implementing the function 200 will provide an output of "1001." It will be noted that the function 200 exhibits varying Hamming distances between input and output bitstrings. For example, the input/output pair "0110"/"1001" has a Hamming distance of 4, while the pair "0101"/"0100" has a Hamming distance of 1. As will be appreciated, the Hamming distance between inputs and outputs serves as an (imperfect) indication of the number of metastable states the S-box will traverse prior to reaching a stable state. For example, in the TRNG 100, when the bitstring "0110" is moved from the output of the forward S-box 110 to its input (via the input register 105), the output may traverse the states "0110"-"0111"-"0011"-"1011"-"1001." These metastable states, along with the varying length of metastability for each input introduces reliable entropy into the TRNG.

FIG. 3 illustrates an example of a function 300 for a reverse S-box. This function 300 may be, for example, the function implemented by the reverse S-box 115 of the first example TRNG 100 when the forward S-box 110 implements the previous function 200. As can be seen, the function 300 is the inverse of the function 200. Where the first function 200 translates the input bitstring "0110" to an output bitstring "1001," the second function 300 translates the bitstring "1001" to the original "0110."

It will be apparent that the two functions 200, 300 are merely examples and that virtually any function may be used. While some embodiments utilize functions 200, 300 having a single full cycle through possible states, other embodiments may utilize functions having two or more smaller cycles. Various additional modifications will be apparent.

Figure 4:
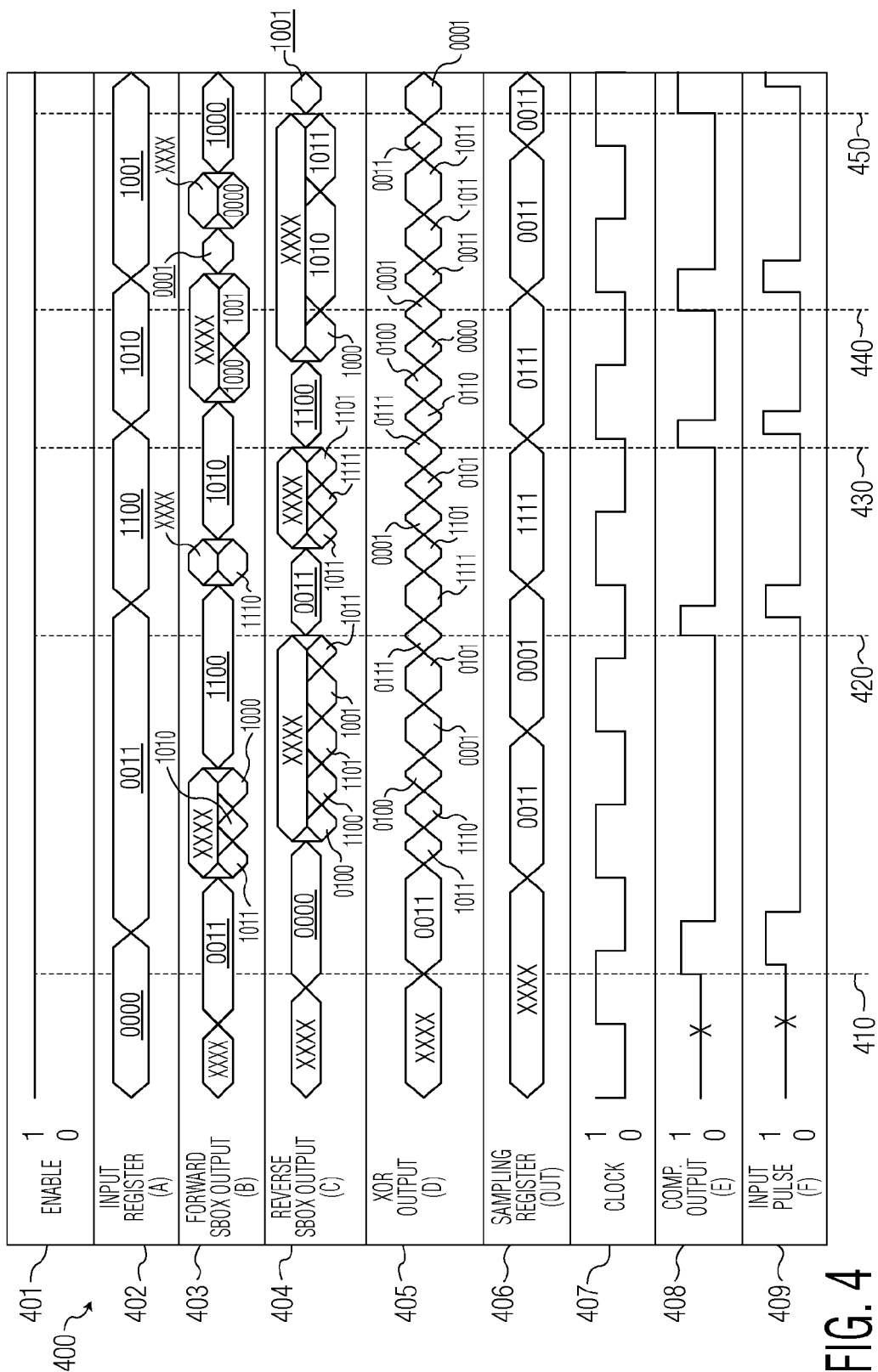
FIG. 4 illustrates an example of a timing diagram showing an operation of a digital TRNG.

FIG. 4 illustrates an example of a timing diagram 400 showing an operation of a digital TRNG. Specifically, the timing diagram 400 may illustrate one possible operation of the first example TRNG 100 implementing the two example functions 200, 300. It will be apparent that the various time lengths and differences displayed are not to scale and are shown for demonstration purposes only.

As shown, the Enable signal 401 is at a logical 1 throughout the timing diagram 400; as such, the TRNG 100 is always generating random numbers. The input register 402 begins at a value of "0000," which is provided as bitstring A to the input of the forward S-box 110. After a delay, the forward S-box output 403 B arrives at the bitstring "0011" (as defined by the forward function 200), which is provided to the input of the reverse S-box 115. Similarly, after a delay, the reverse S-box output 404 D arrives at the bitstring "0000" (as defined by the reverse function 300). At time 410, the comparator 120 judges the signals A 402 and C 404 to be equivalent (both equal to "0000") and outputs a pulse E 408 which, after the delay imposed by the AND gate 130, is delivered to the input register 105, thereby advancing the TRNG state (moving the value "0011" from signal B 403 to signal A 402, restarting the TRNG's movement toward stability). In the meantime, the clock 407 provides a pulse to the sampling register which moves the current XOR output D 405 of "0011" into the sampling register 406. Thus, the first sampled random number in the timing diagram 400 is "0011."

Continuing on, due to the signal A 402 changing to the value "0011," the forward S-box 110 begins to transition from its current output ("0011") to the stable output for its new input ("1100," as defined by the forward function 200." As will be understood, all 4 output bits are unlikely to change to their stable values at the exact same time; instead, the output B traverses an undefined state (including one or more metastable states) before arriving at the new stable value of "1100." These metastable states are not deterministic and, as such, are likely to differ from execution to execution of this (and each) output transition. For example, as shown, this first transition is shown to traverse metastable states "1011," "1010," and "1000" before arriving at the stable value "1100." It will be understood that this is just one example of a series of metastable states between the outputs "0011" and "1100." Various alternative transitions are likely be observed in a given circuit.

These metastable states have a cascading effect on the reverse S-box. Specifically, the reverse S-box 115 does not differentiate between stable and metastable inputs. Thus, in the example shown, when the metastable value "1011" for signal B 403 is provided to the input of the reverse S-box 115, the signal C 404 begins to transition from the previous stable value "0000" to the value "0111" (as defined by the reverse function 300), first visiting the metastable state "0100." Similarly, when signal B 403 visits the next metastable state "1010," the signal C 404 begins a new transition from "0100" toward the value "1100" (as defined by the reverse function 300), arriving immediately at the "1100 state (due to the Hamming distance of 1). This state, however, is also metastable because it is based on a metastable input. Eventually, signal B 403 achieves its stable value "1100," and the signal C 404 (already in the midst of metastability) begins to transition through additional metastable states to the true stable state of "0011" (causing, upon arrival, the signal E 408 to generate another state change pulse at time 420).

Thus, the S-boxes 110, 115 continue on in this manner, advancing states at times 410, 420, 430, 450 in response to arriving at their stable states. It will be noted that, in some implementations, the comparator 120 may "erroneously" cause the state to advance before the S-boxes 110, 115 achieve their stable states due to a metastable state of signal C 404 incidentally matching the input signal A 402. As an example, at time 440, signal C 404 arrives at a metastable state "1010" based on a metastable input "1001" from signal B 403. Because signals A 402 and C 404 match at that time 440, the comparator signal E pulses, causing the state to advance, even though the reverse S-box 115 has not actually achieved a stable state. In the illustrated example, the forward S-box 110 has also not achieved its stable state and, as such, its metastable value "1001" is moved into the input register 105 instead, thereby jumping to a different position in the S-box cycle. This "glitch," however, is not undesirable. Instead, this additional uncertainty may introduce additional entropy into the system, increasing the quality of the generated random numbers.

As can be readily seen, the various metastable states occupied by the signals B 403 and C 404 throughout the timing diagram have a drastic effect on the combined signal D 405. Specifically, after the TRNG 100 "warms up," the combined signal D 405 is in a constant state of flux. Due in part to the fact that the signal D 405 is largely based on non-deterministic metastable values, the values sampled from the combined signal D 405 into the sampling register 406 are truly random. Thus, through use of digital components (specifically, S-boxes in this example), the TRNG is able to generate random numbers at a relatively high rate while carrying a small and unidentifiable footprint within a larger device. It will be apparent that the principles of generating random numbers using digital component metastability can be extended or alternatively applied in various other designs, two examples of which will be described below. Various alternative circuits for sampling metastable states will be apparent in view of the present disclosure.

Figure 5:
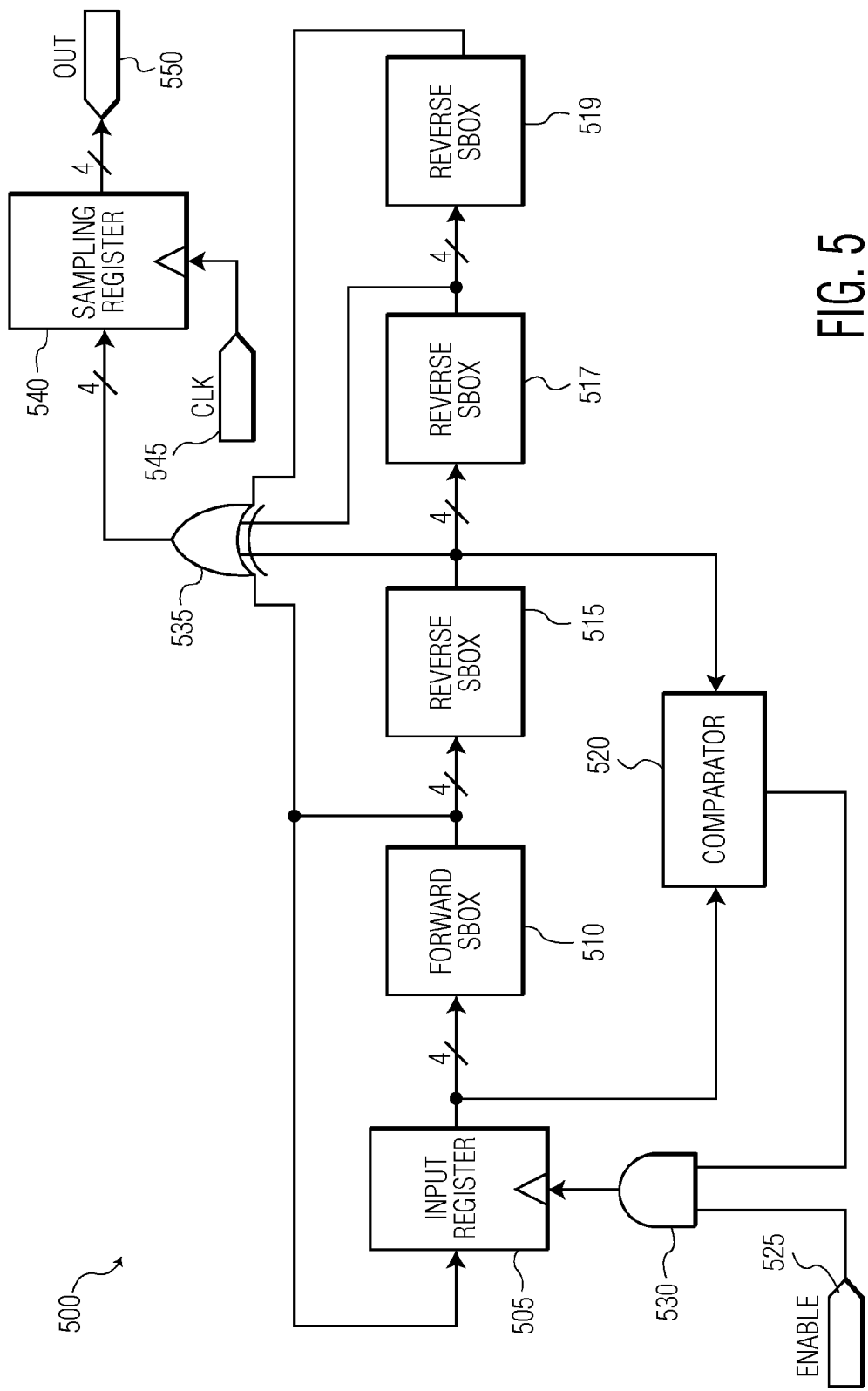
FIG. 5 illustrates a second example of a digital TRNG.

FIG. 5 illustrates a second example of a digital TRNG 500. The second TRNG 500 shares similarities with the first TRNG 100. Specifically, an input register 505 provides four bits to the input of a forward S-box 510 which, in turn, provides four substituted bits to the input of a reverse S-box 515. As with the first TRNG 100, these two S-boxes 510, 515 may implement inverse substitution functions from each other such as, for example, the functions 200, 300 respectively. A state advancement circuit uses a comparator 520 to determine when the input to the forward S-Box 510 matches the output of the reverse S-Box 515 and generates a pulse to the input register 505 (conditioned on the assertion of an Enable signal 525 to an AND gate 530) upon detecting a match. This pulse moves the output bit string from the forward S-Box 510 into the input register 505, advancing the overall state of the circuit.

The second TRNG 500 has the addition of an S-box tail including (in this example) two additional S-Boxes 517, 519 that operate to amplify the effects of metastability on the sampled numbers. The tail may include fewer or greater S-boxes; in some embodiments, the S-Box tail may include seven or eight additional S-Boxes (not shown) after the original two 510, 515. The addition of S-boxes to the tail initially has an effect of increasing the effect of the metastability and, as more are added, diminishing returns or even reduced performance may be encountered. A number of tail S-Boxes appropriate to a given application may be easily discerned through experimentation.

As shown, the tail S-Boxes 517, 519 are all also reverse S-Boxes and, as such, may implement the same substitution function as the first reverse S-Box 515. Such an arrangement may help to ensure that the outputs of each the tail S-boxes are "new" and do not "cancel out" another S-box output when sampled through the XOR gates 535, especially when the substitution function implements a full cycle. It will be apparent, however, that the tail S-Boxes 517, 519 need not implement the same function as the reverse S-Box 515 or as each other 517, 519 to aid in random number generation.

The outputs of each of the S-boxes 510, 515, 517, 519 are combined through an XOR gate array 535 and provided to the input of a sampling register 540. As before, while an XOR gate array 535 is shown, various alternative arrangements for combining bitstrings will be apparent (e.g., different gates may be used, different bit positions from different bitstrings may be combined, bitstrings may be sampled from within the S-boxes 510, 515, 517, 519, etc.).

Upon receiving a clock 545 pulse, the sampling register 540 will store the bitstring currently at its input and provide this sampled number to the output 550 of the TRNG 500. Again, in some embodiments, it is preferable to provide a clock 545 with appreciable jitter, thereby introducing additional entropy into the TRNG 500.

Figure 6:
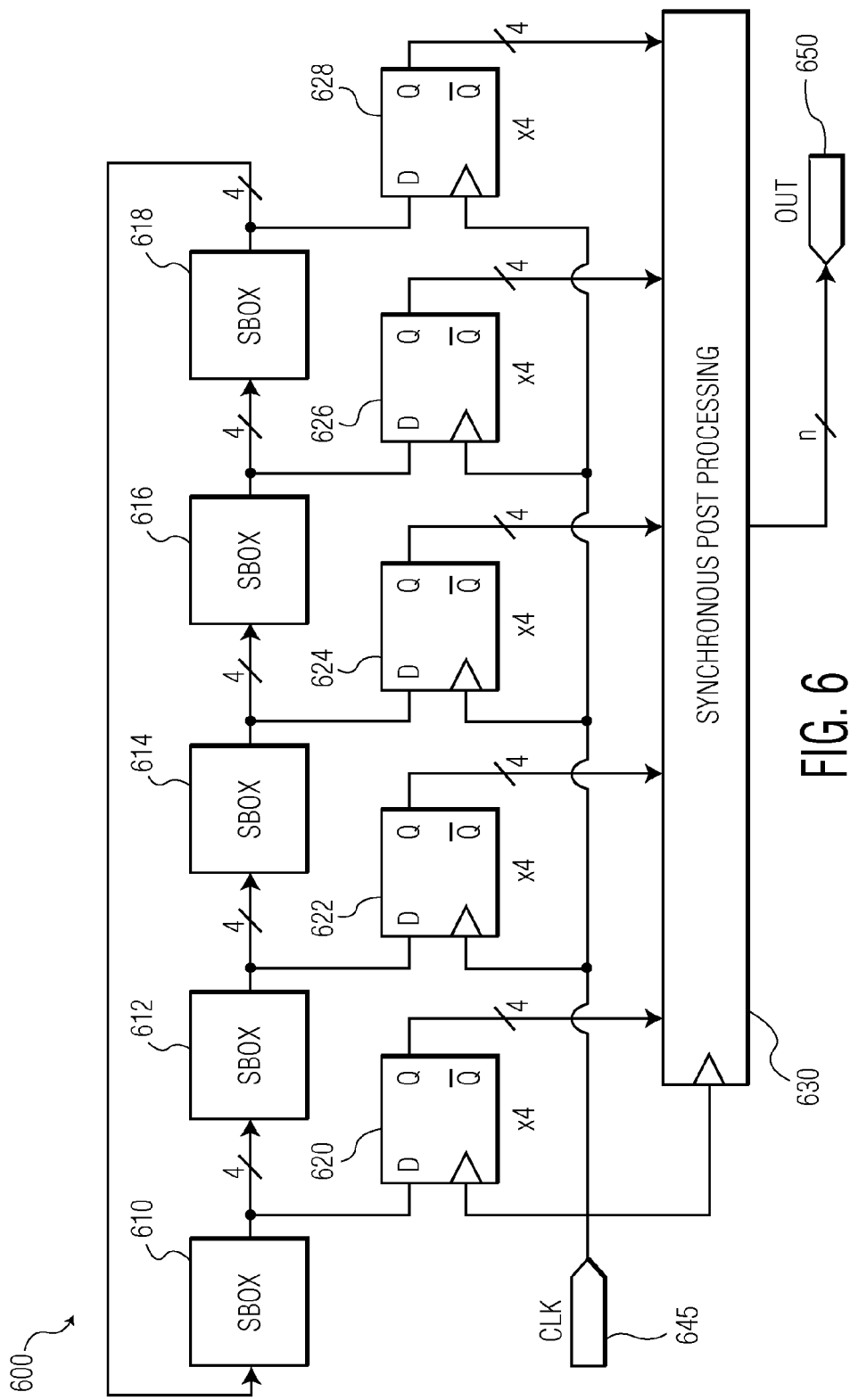
FIG. 6 illustrates a third example of a digital TRNG.

FIG. 6 illustrates a third example of a digital TRNG 600. This third TRNG 600 includes a plurality of S-Boxes 610, 612, 614, 616, 618 configured in a ring such that the output of each S-Box 610-618 is provided to the input of the next S-Box. The substitution functions of the S-Boxes 610-618 may be virtually any substitution function. In some embodiments, each of the S-Boxes implement the same substitution function which includes a single full cycle through values. In this manner, the S-Boxes 610-618 implement a ring oscillator that will continually change on its own (and therefore does not utilize a separate state advancement circuit). It will also be apparent that fewer or greater number of S-boxes may be used in the ring. In various embodiments, the number of S-boxes is selected to be coprime with the number of possible states. For example, as shown, each S-box operates on four bits, providing sixteen different states, while five S-Boxes 610-618 have been included in the ring; these numbers are coprime, thereby leading to enhanced results.

A plurality of registers (shown as arrays of flip flops) 620, 622, 624, 626, 628 are arranged to synchronously sample the output bits of the S-Boxes 610-618 (or, in some embodiments, internal bits of one or more of the S-Boxes between input and output terminals). In a manner similar to that described above with respect to the first and second TRNGs 100, 500, because the S-Box ring 610-618 operates asynchronously, the registers 620-628 are likely to often sample metastable outputs from the S-Boxes 610-618. Due to the non-deterministic nature of this metastability, these outputs serve as useful sources of entropy for random number generation. The clock 645 driving this synchronous sampling in some embodiments may be chosen to exhibit considerable jitter.

The third TRNG 600 also includes a synchronous post processing 630 circuit to combine these sampled numbers into a random number presented to the output 650 of the TRNG. Specifically, while in some applications, the twenty bits sampled into the registers 620-628 may be suitable, other applications may demand random numbers having a higher quality. The synchronous post processing block 630 may implement various operations that use these twenty sampled bits as entropy sources to generate a suitable random number for output 650. For example, in some embodiments the synchronous post processing block 630 may first compresses the sampled bits using a cyclic redundancy check (CRC) algorithm to combine each set of four sampled bits together and then perform a block cipher on the result to produce n output bits. For example, in some embodiments, the block cipher may be performed on four bits at a time to produce a 4 bit random number on each output. In other embodiments, the block cipher may operate on larger blocks of data. In such embodiments, the synchronous post processing block 630 may store subsequent CRC outputs (or bits directly from the registers 620-628 or bits resulting from other post-processing operations) until n bits have been acquired and only then compute the block cipher. For example, the block cipher may operate on 512 bits; as such, the synchronous post processing block 630 may compute CRCs for 128 cycles and then compute a block cipher of the accumulated 512 bits for output 650.

It will be apparent that the synchronous post processing 630 may be useful to implement in other TRNGs other than this third example 600. For example, similar processing may be implemented in either of the first two example TRNGS 100, 500. It will also be apparent that various post-processing operations may be implemented in software and, as such, the post processing block 630 may include a microprocessor, field programmable gate array (FPGA), or other processor sufficient to perform such operations. In other embodiments, the encryption operations may be implemented solely in hardware; as such the synchronous post processing block 630 may be an application specific integrated circuit (ASIC).

According to the foregoing, various embodiments enable the generation of random numbers using a relatively small number of digital components. For example, by sampling metastable outputs of multi-bit digital components, true random numbers may be generated in a circuit that is difficult to identify and, therefore, influence or otherwise attack. In the examples shown, S-Boxes are used wherein propagation time from input to output is data dependent, thereby creating chaotic behavior from which random numbers may be sampled. Various additional benefits will be apparent in view of the foregoing.

It should be apparent from the foregoing description that various embodiments of the invention may be implemented in hardware. Furthermore, various embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various embodiments have been described in detail with particular reference to certain aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A hardware device for generating random numbers comprising:
 a plurality of cryptographic substitution boxes ("S-Boxes") connected to each other in a series, wherein a plurality of bits output from an S-Box of the plurality of cryptographic S-Boxes is input into another S-Box of the cryptographic plurality of S-Boxes; and a sampling circuit configured to sample bit strings from at least one S-Box of the plurality of cryptographic S-Boxes.

2. The hardware device of claim 1, wherein:
the plurality of cryptographic S-Boxes comprises
a forward S-Box configured to implement first function that maps input bit strings to respective output bit strings, and
a reverse S-Box configured to implement a second function that is an inverse of the first function,
wherein the forward S-Box outputs a plurality of bits to an input of the reverse S-Box.

3. The hardware device of claim 2, wherein:
the plurality of cryptographic S-Boxes further comprises series of tail S-Boxes comprising:
at least one tail S-Box, including a first tail S-Box configured to receive, as input, output from the reverse S-Box.

4. The hardware device of claim 3, wherein each tail S-Box in the series of tail S-Boxes implements the second function.

5. The hardware device of claim 3, wherein the sampling circuit comprises a plurality of XOR gates configured to combine a plurality of bit strings received from each of the forward S-Boxes, the reverse S-Box, and each tail S-Box of the plurality of tail S-Boxes.

6. The hardware device of claim 5, wherein the sampling circuit further comprises:
a sampled number register configured to
receive, as input, a combined bitstring output by the plurality of XOR gates, and upon receiving a pulse from a clock signal, store the combined bitstring.

7. The hardware device of claim 2, further comprising a state advancement circuit configured to move a signal output by the forward S-Box to the input of the forward S-Box when the reverse S-Box reaches a stable state.

8. The hardware device of claim 7, wherein the state advancement circuit comprises:
an input register configured to
receive, as input, a substituted bitstring output by forward S-Box,
upon receiving an asynchronous pulse, store the substituted bitstring, and
output a stored bitstring to the input of the forward S-Box;
a comparator circuit configured to
compare a bitstring input to the forward S-Box with a bitstring output by the reverse S-Box, and
when the bitstring input matches a bitstring output by the reverse S-Box, generate the asynchronous pulse.

9. The hardware device of claim 1, wherein:
the plurality of cryptographic S-Boxes is configured in a ring of S-Boxes such that:
each S-Box of the plurality of cryptographic S-Boxes provides output to an input of a next S-Box of the ring of S-Boxes.

10. The hardware device of claim 1, wherein the sampling circuit comprises a plurality of XOR gates configured to combine at least two bit strings received from different parts of the plurality of cryptographic S-Boxes.

11. The hardware device of claim 10, wherein each S-Box implements the same function mapping input bitstrings to respective output bitstrings.

12. The hardware device of claim 10, wherein:
a first S-Box of the plurality of cryptographic S-Boxes is capable of occupying a number of different states, a; and
the plurality of cryptographic S-Boxes includes a number of S-Boxes, b, that is coprime with the number of different states, a.

13. The hardware device of claim 10, wherein the sampling circuit is configured to sample a plurality of bit strings from the plurality of cryptographic S-Boxes, respectively, the device further comprising:
a post-processing circuit configured to compress the plurality of bit strings.

14. The hardware device of claim 1, wherein the sampling circuit is configured to sample bit strings from the output at least one S-Box of the plurality of cryptographic S-Boxes.

15. A hardware device for generating random numbers comprising:
a digital circuit configured to output a plurality of parallel bits based on an input wherein the digital circuit is capable of occupying a metastable state between a time the input is changed and a time the output plurality of parallel bits changes based on the changed input, wherein the digital circuit outputs metastable bits while occupying the metastable state; and
a synchronous sampling circuit configured to sample bits from the digital circuit in synchronization with a received clock signal pulse,
wherein when the clock signal pulse occurs while the digital circuit occupies a metastable state, the synchronous sampling circuit samples metastable bits,
wherein the input into the digital circuit changes in a manner that is asynchronous with respect to the clock signal pulse, and
wherein the digital circuit is a cryptographic substitution box (S-Box).

16. The hardware device of claim 15, further comprising an inverse digital circuit that performs an inverse operation of the digital circuit, whereby the digital circuit and inverse digital circuit are arranged in sequence to form a pair of digital circuits.

17. The hardware device of claim 16, further comprising a state advancement circuit configured to change the input into the digital circuit when an input into the pair of digital circuits matches an output of the pair of digital circuits.

18. The hardware device of claim 15, wherein the manner in which the input into the digital circuits changes enables metastable bits to be moved from the output of the digital circuit to the input of the digital circuit.

19. The hardware device of claim 15, further comprising:
an additional digital circuit, wherein the synchronous sampling circuit configured to sample additional bits from the additional digital circuit in synchronization with the received clock signal pulse; and
a synchronous post-processing circuit configured to compress the sampled bits and additional bits.

* * * * *